United States Patent
Yoo et al.

(10) Patent No.: US 11,685,830 B2
(45) Date of Patent: Jun. 27, 2023

(54) FLAME RETARDANT RESIN COMPOSITION AND FLAME RETARDANT RESIN MOLDED ARTICLE MANUFACTURED THEREFROM

(71) Applicant: LG CHEM, LTD., Seoul (KR)

(72) Inventors: Je Sun Yoo, Daejeon (KR); Ki Young Nam, Daejeon (KR); Jae Young Sim, Daejeon (KR); Seon Hyeong Bae, Daejeon (KR); Jae Yeon Bae, Daejeon (KR); In Seok Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 232 days.

(21) Appl. No.: 17/052,789

(22) PCT Filed: Aug. 14, 2019

(86) PCT No.: PCT/KR2019/010361
§ 371 (c)(1),
(2) Date: Nov. 3, 2020

(87) PCT Pub. No.: WO2020/130273
PCT Pub. Date: Jun. 25, 2020

(65) Prior Publication Data
US 2021/0246306 A1 Aug. 12, 2021

(30) Foreign Application Priority Data

Dec. 17, 2018 (KR) .................... 10-2018-0163504
Aug. 13, 2019 (KR) .................... 10-2019-0098712

(51) Int. Cl.
C08L 71/12 (2006.01)
C08L 25/06 (2006.01)
C08L 55/02 (2006.01)

(52) U.S. Cl.
CPC ............. *C08L 71/123* (2013.01); *C08L 25/06* (2013.01); *C08L 55/02* (2013.01); C08L 2201/02 (2013.01); C08L 2201/22 (2013.01); C08L 2205/03 (2013.01)

(58) Field of Classification Search
CPC ........ C08L 71/123; C08L 25/06; C08L 55/02; C08L 2201/02
See application file for complete search history.

(56) References Cited

U.S. PATENT DOCUMENTS

| 2010/0087573 A1 | 4/2010 | Cartier et al. |
| 2012/0184635 A1 | 7/2012 | Eberstaller et al. |
| 2015/0094414 A1* | 4/2015 | Lee .................. C08L 51/04 524/504 |
| 2017/0260363 A1 | 9/2017 | Pfaendner et al. |
| 2017/0260366 A1 | 9/2017 | Pfaendner et al. |
| 2019/0100647 A1 | 4/2019 | Yoo et al. |

FOREIGN PATENT DOCUMENTS

| CN | 1637063 A | 7/2005 |
| CN | 101945937 A | 1/2011 |
| CN | 102597091 A | 7/2012 |
| CN | 104592737 A | 5/2015 |
| CN | 105330986 A | 2/2016 |
| JP | 2004-210882 A | 7/2004 |
| JP | 2013-527859 A | 7/2013 |
| JP | 2017-535626 A | 11/2017 |
| KR | 20050060260 A | 6/2005 |
| KR | 10-0602850 B1 | 7/2006 |
| KR | 10-2012-0048601 A | 5/2012 |
| KR | 10-2017-0066102 A | 6/2017 |
| KR | 10-2018-0052512 A | 5/2018 |
| WO | WO2009-081381 A | 7/2009 |

OTHER PUBLICATIONS

Machine translation of JP 5882985B2 (Year: 2013).*

* cited by examiner

*Primary Examiner* — Wenwen Cai

(57) ABSTRACT

The present invention relates to a flame retardant resin composition having excellent flame retardancy and improved thermal deformation properties, and a flame retardant resin molded article manufactured therefrom, and provides a flame retardant resin composition including a) a base resin including a polyarylene ether-based polymer; an aromatic vinyl-based polymer and a copolymer of vinylcyan monomer-conjugated diene monomer-aromatic vinyl monomer; b) an organophosphorus-based flame retardant; c) a hypophosphite compound; and d) a sulfur-containing compound including at least two sulfur atoms, wherein b) the organophosphorus-based flame retardant, c) the hypophosphite compound and d) the sulfur-containing compound are included in a weight ratio of 15 to 24:2 to 4:2 to 5.

11 Claims, No Drawings

FLAME RETARDANT RESIN COMPOSITION AND FLAME RETARDANT RESIN MOLDED ARTICLE MANUFACTURED THEREFROM

CROSS-REFERENCE TO RELATED APPLICATIONS

The present application claims the benefit of priority based on Korean Patent Application Nos. 10-2018-0163504, filed on Dec. 17, 2018, and 10-2019-0098712, filed on Aug. 13, 2019, the entire contents of which are incorporated herein by reference.

TECHNICAL FIELD

The present invention relates to a flame retardant resin composition having excellent flame retardancy and improved thermal deformation properties, and a flame retardant resin molded article manufactured therefrom.

BACKGROUND ART

The regulation on flame retardancy follows the standards of Underwriters Laboratories (UL), and in order to prepare a resin composition, specifically, a thermoplastic resin composition having flame retardancy suitable to the standards of UL, a method of mixing a halogen-based flame retardant and flame retardant aid with a thermoplastic resin has been adopted. As the halogen-based flame retardant, polybromodiphenyl ether, tetrabromobisphenol A, a bromine-substituted epoxy compound, polyethylene chloride, etc. are mainly used, and as the flame retardant aid, an antimony-based compound has been mainly used.

As described above, the method of imparting the thermoplastic resin with flame retardancy by applying the halogen-based flame retardant together with the antimony-based flame retardant aid, has merits in achieving excellent flame retardancy and rarely generating the degradation of the physical properties of a final product, but has problems in generating a hydrogen halide gas during processing to possibly damage a mold, and with this, discharging strongly carcinogenic dioxin from an incinerator during discarding due to the presence of a halogen compound to adversely affect environment and human body. Further, recently, the regulation on a halogen-based flame retardant resin material has been active. Accordingly, the development of a flame retardant thermoplastic resin composition material excluding a halogen element is required.

Accordingly, a method for preparing a flame retardant thermoplastic resin composition excluding a halogen element has been studied, and a method of applying a phosphor-based flame retardant by blending with polyphenylene ether has been suggested.

Polyarylene ether such as polyphenylene ether is a noncrystalline resin and has merits of high dimensional stability, insulating properties and heat resistance and excellent mechanical strength, but has low flowability and difficulty in injecting molding, and requires high temperature for processing, and thus, shows markedly degraded moldability. In order to supplement such shortcomings, a method of improving moldability by mixing polyarylene ether and polystyrene or impact resistant polystyrene and using has been suggested. A polyarylene ether-based polymer, and polystyrene and impact resistant polystyrene showed excellent compatibility irrespective of their contents and may compensate the properties from each other, thereby showing advantages in improving moldability.

However, due to the high processing temperature of polyarylene ether, the use of a flame retardant is too restrictive. If a flame retardant with a certain range or more is added to secure flame retardancy, the thermal deformation temperature is decreased, and the flame retardant is protruded during processing from the surface of a processed and molded product during processing into a wiring such as a cable to degrade appearance and quality.

DISCLOSURE OF THE INVENTION

Technical Problem

The present invention has an object of providing a flame retardant resin composition having excellent flame retardancy and excellent thermal deformation properties.

In addition, the present invention has an object of providing a flame retardant resin molded article having excellent flame retardancy and improved thermal deformation properties by manufacturing using the flame retardant resin composition.

Technical Solution

To solve the above-described tasks, according to an embodiment of the present invention, the present invention provides a flame retardant resin composition including a) a base resin including a polyarylene ether-based polymer; an aromatic vinyl-based polymer and a copolymer of vinylcyan-based monomer-conjugated diene-based monomer-aromatic vinyl-based monomer; b) an organophosphorus-based flame retardant; c) a hypophosphite compound; and d) a sulfur-containing compound including at least two sulfur atoms, wherein b) the organophosphorus-based flame retardant, c) the hypophosphite compound and d) the sulfur-containing compound are included in a weight ratio of 15 to 24:2 to 4:2 to 5.

In addition, the present invention provides a flame retardant resin molded article manufactured from the flame retardant resin composition, wherein flammability class measured according to flammability standards of UL-94 VB is V-0, and thermal deformation temperature measured under load conditions of 18.5 kg/cm$^2$ according to ASTM D648 is 80° C. or more.

Advantageous Effects

The flame retardant resin composition according to the present invention includes as a base resin, a polyarylene ether-based polymer, an aromatic vinyl-based polymer and a copolymer of vinylcyan-based monomer-conjugated diene-based monomer-aromatic vinyl-based monomer, and may have excellent impact resistance, heat resistance, electrical properties, dimensional stability, and moldability, and includes an organophosphorus-based flame retardant, a hypophosphite compound and a sulfur-containing compound containing at least two sulfur atoms in a specific weight ratio, and may have sufficiently elevated flame retardancy with a reduced amount of the organophosphorus-based flame retardant due to the synergistic effect of the organophosphorus-based flame retardant, the hypophosphite compound and the sulfur-containing compound, thereby restraining the deterioration of thermal deformation properties due to the excessive use of the organophosphorus-based flame retardant and as a result, showing excellent flame retardancy and thermal deformation properties in balance.

In addition, the flame retardant resin molded article according to the present invention is manufactured from the flame retardant resin composition, and excellent impact resistance, heat resistance, electrical properties, dimensional stability, and moldability may be achieved in balance, and excellent flame retardancy and thermal deformation properties may be achieved.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The terms and measurement methods used in the present invention may be defined as follows unless separately defined.

Terms

The term "composition" used in the present invention includes a mixture of materials including the composition as well as a reaction product and a decomposition product formed from the materials of the corresponding composition.

The term "alkyl group" used in the present invention may mean a monovalent aliphatic saturated hydrocarbon and may include both a linear alkyl group such as methyl, ethyl, propyl and butyl, and a branched alkyl group such as isopropyl, sec-butyl, tert-butyl and neo-pentyl.

The term "cycloalkyl group" used in the present invention may mean a cyclic saturated hydrocarbon.

The term "aryl group" used in the present invention may mean cyclic aromatic hydrocarbon, and may include both monocyclic aromatic hydrocarbon in which one ring is formed, and polycyclic aromatic hydrocarbon in which two or more rings are combined.

The term "alkoxy group" used in the present invention may mean a monovalent atomic group composed by combining an alkyl group with an oxygen atom.

The term "aryloxy group" used in the present invention may mean a monovalent atomic group composed by combining an aryl group with an oxygen atom.

The term "arylalkyl group" used in the present invention is also referred to as an aralkyl group and may mean a combined group of an alkyl group and an aryl group formed by substituting a hydrogen atom combined with carbon composing an alkyl group with an aryl group.

The term "alkylaryl group" used in the present invention may mean a combined group of an aryl group and an alkyl group formed by substituting a hydrogen atom combined with carbon composing an aryl group with an alkyl group.

The term "alkyl group of 1 to 20 carbon atoms, including Br, Cl or CN" used in the present invention may mean an alkyl group in which one of hydrogen atoms combined with carbon composing an alkyl group is substituted with Br, Cl or CN.

The term "derived unit" used in the present invention may mean a structure come from a certain material, or the material itself.

The term "aromatic vinyl-based monomer" used in the present invention may be one or more selected from the group consisting of styrene, α-methylstyrene, α-ethylstyrene, p-methylstyrene, o-methylstyrene, o-t-butylstyrene, bromostyrene, chlorostyrene, trichlorostyrene and the derivatives thereof, particularly, styrene.

The term "vinylcyan-based monomer" used in the present invention may be one or more selected from the group consisting of acrylonitrile, methacrylonitrile, ethacrylonitrile and the derivatives thereof, particularly, acrylonitrile.

The term "conjugated diene-based monomer" used in the present invention may be one or more selected from the group consisting of 1,3-butadiene, 2,3-dimethyl-1,3-butadiene, 2-ethyl-1,3-butadiene, 1,3-pentadiene and isoprene, particularly, 1,3-buadiene.

The term "derivative" used in the present invention may represent a compound with a structure in which one or more among hydrogen atoms composing an original compound are substituted with halogen groups, alkyl groups or hydroxyl groups.

[Measurement Method]

In the present invention, flammability class was assessed according to the flammability standards of UL-94 VB after manufacturing two specimens with a thickness of 2 mm from a flame retardant molded article and combusting thereof, and the flammability class was used as an index showing the degree of excellence of flame retardancy.

In the present invention, the thermal deformation temperature was measured under load conditions of 18.5 kg/cm$^2$ according to ASTM D648.

The present invention provides a flame retardant resin composition having excellent flame retardancy and excellent thermal deformation properties.

The flame retardant resin composition according to an embodiment of the present invention is characterized in including a) a base resin including a polyarylene ether-based polymer, an aromatic vinyl-based polymer and a copolymer of vinylcyan-based monomer-conjugated diene-based monomer-aromatic vinyl-based monomer; b) an organophosphorus-based flame retardant; c) a hypophosphite compound; and d) a sulfur-containing compound including at least two sulfur atoms, wherein b) the organophosphorus-based flame retardant, c) the hypophosphite compound and d) the sulfur-containing compound are included in a weight ratio of 15 to 24:2 to 4:2 to 5.

Generally, a polyarylene ether-based polymer has merits of having high dimensional stability, insulating properties and heat resistance and excellent mechanical strength, but has low flowability and difficulty in injection molding, has high temperature for processing and problems of significantly degrading moldability, and accordingly, moldability is improved by mixing polystyrene or impact resistant polystyrene and using as a base resin. In order to secure flame retardancy, a flame retardant is mixed together. However, in order to show sufficient flame retardancy, a large amount of flame retardant is required, but if the flame retardant is added in an amount of a certain amount or more, thermal deformation temperature is decreased, and the flame retardant is protruded from the surface of a processed and molded product during processing into a wiring such as a cable, thereby degrading appearance and quality.

However, the flame retardant resin composition according to the present invention includes a base resin including a polyarylene ether-based polymer, an aromatic vinyl-based polymer and a copolymer of vinylcyan-based monomer-conjugated diene-based monomer-aromatic vinyl-based monomer, an organophosphorus-based flame retardant, a hypophosphite compound and a sulfur-containing compound together, and may have sufficiently increased flame retardancy with a reduced amount of the organophosphorus-based flame retardant due to the synergistic effect of the organophosphorus-based flame retardant, the hypophosphite compound and the sulfur-containing compound, thereby restraining the deterioration of thermal deformation properties due to the excessive use of the organophosphorus-based flame retardant and as a result, showing excellent flame retardancy and thermal deformation properties in balance.

Particularly, the flame retardant resin composition according to another embodiment of the present invention may include a) 100 parts by weight of the base resin; b) 10 parts by weight to 40 parts by weight of the organophosphorus-based flame retardant; c) 0.1 parts by weight to 5.0 parts by weight of the hypophosphite compound; and d) 1 part by weight to 10 parts by weight of the sulfur-containing compound, more particularly, a) 100 parts by weight of the base resin; b) 15 parts by weight to 25 parts by weight of the organophosphorus-based flame retardant; c) 0.5 parts by weight to 3.0 parts by weight of the hypophosphite compound; and d) 1 part by weight to 5 parts by weight of the sulfur-containing compound. In this case, flame retardancy and thermal deformation properties may be even more excellent.

Hereinafter, each configuration element of the flame retardant resin composition of the present invention will be explained in particular.

a) Base Resin

The base resin according to an embodiment of the present invention may include a polyarylene ether-based polymer; an aromatic vinyl-based polymer and a copolymer of vinylcyan-based monomer-conjugated diene-based monomer-aromatic vinyl-based monomer.

Particularly, the base resin may include, based on 100 parts by weight of the base resin, 20 parts by weight to 70 parts by weight of the polyarylene ether-based polymer; 20 parts by weight to 70 parts by weight of the aromatic vinyl-based polymer; and 10 parts by weight to 40 parts by weight of the copolymer of vinylcyan-based monomer-conjugated diene monomer-aromatic vinyl-based monomer, and in this case, the physical properties of each polymer may not be diminished and the physical properties of each may be maximally shown, and accordingly, the impact resistance, heat resistance, electrical properties, dimensional stability and moldability of the flame retardant resin composition including the base resin may be excellent in balance.

The polyarylene ether-based polymer plays the role of providing the flame retardant resin composition including the same with excellent heat resistance, electrical properties and dimensional stability, and may be a homopolymer or a copolymer including a unit represented by the following Formula 2:

[Formula 2]

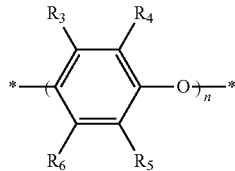

In Formula 2, $R_3$ to $R_6$ are each independently a hydrogen atom, a halogen group, a hydroxyl group, a cyano group, a nitro group, an alkyl group of 1 to 20 carbon atoms, a cycloalkyl group of 3 to 20 carbon atoms, an aryl group of 6 to 20 carbon atoms, an alkoxy group of 1 to 20 carbon atoms, an arylalkyl group of 7 to 20 carbon atoms, an alkylaryl group of 7 to 20 carbon atoms, an aryloxy group of 6 to 20 carbon atoms, or an alkyl group of 1 to 20 carbon atoms, containing Br, Cl or CN, and n is an integer of 4 to 20.

Particularly, in Formula 2, $R_3$ to $R_6$ may be each independently a hydrogen atom, an alkyl group of 1 to 10 carbon atoms, a cycloalkyl group of 3 to 10 carbon atoms, an aryl group of 6 to 10 carbon atoms, an alkoxy group of 1 to 10 carbon atoms, an arylalkyl group of 7 to 12 carbon atoms, an alkylaryl group of 7 to 20 carbon atoms, an aryloxy group of 6 to 12 carbon atoms, or an alkyl group of 1 to 10 carbon atoms, containing Br, Cl or CN, and n is the repeating number of the unit and may be an integer of 4 to 20.

In another embodiment, in the present invention, in case where the polyarylene ether-based polymer is the homopolymer, the polyarylene ether-based polymer may be one or more selected from the group consisting of poly(2,6-dimethyl-1,4-phenyleneoxide), poly(2,6-diethyl-1,4-phenyleneoxide), poly(2-methyl-6-ethyl-1,4-phenyleneoxide), poly(2-methyl-6-propyl-1,4-phenyleneoxide), poly(2,6-dipropyl-1,4-phenyleneoxide), poly(2-ethyl-6-propyl-1,4-phenyleneoxide), poly(2,6-dimethoxy-1,4-phenyleneoxide), poly(2,6-di(chloromethyl)-1,4-phenyleneoxide), poly(2,6-di(bromomethyl)-1,4-phenyleneoxide), poly(2,6-diphenyl-1,4-phenyleneoxide), poly(2,6-dichloro-1,4-phenyleneoxide), poly(2,6-dibenzyl-1,4-phenyleneoxide) and poly(2,5-dimethyl-1,4-phenyleneoxide), and particularly, the polyarylene ether-based polymer may be poly(2,6-dimethyl-1,4-phenyleneoxide).

In addition, in case where the polyarylene ether-based polymer is the copolymer, the polyarylene ether-based polymer may be one or more selected from the group consisting of a copolymer including a derived unit of 2,6-dimethylphenol and a derived unit of 2,3,6-trimethylphenol; a copolymer including a derived unit of 2,6-dimethylphenol and a derived unit of o-cresol; and a copolymer including a derived unit of 2,3,6-trimethylphenol and a derived unit of o-cresol.

In addition, the polyarylene ether-based polymer may have a weight average molecular weight of 5,000 g/mol to 100,000 g/mol, particularly, 20,000 g/mol to 80,000 g/mol or 50,000 g/mol to 75,000 g/mol, and within this range, the dimensional stability may be even more excellent.

Meanwhile, the polyarylene ether-based polymer may be included in the base resin in 20 parts by weight to 70 parts by weight, particularly, 20 parts by weight to 50 parts by weight, or 30 parts by weight to 40 parts by weight, based on 100 parts by weight of the base resin as described above, and within this range, balance with other polymers included in the base resin is excellent, and the heat resistance, electrical properties and dimensional stability properties of the polyarylene ether-based polymer may be sufficiently shown without diminishing the physical properties of the other polymers, and thus, the impact resistance, heat resistance, electrical properties, dimensional stability and moldability of the base resin including thereof may be excellent in balance.

In addition, the aromatic vinyl-based polymer plays the role of providing the flame retardant resin composition including the same with excellent moldability, and may be a polymer including a derivative of an aromatic vinyl-based monomer, which is obtained by polymerizing an aromatic vinyl-based monomer.

Particularly, the aromatic vinyl-based polymer may have a weight average molecular weight of 10,000 g/mol to 300,000 g/mol, more particularly, 20,000 g/mol to 300,000 g/mol or 100,000 g/mol to 300,000 g/mol, and within this range, the moldability may be even more excellent.

Meanwhile, the aromatic vinyl-based polymer may be included in the base resin in 20 parts by weight to 70 parts by weight in the base resin based on 100 parts by weight of the base resin as described above, and may particularly be included in 30 parts by weight to 50 parts by weight, or 35 parts by weight to 50 parts by weight, and within this range, balance with other polymers included in the base resin is excellent, and the moldability of the aromatic vinyl-based polymer may be sufficiently shown without diminishing the physical properties of the other polymers, and thus, the impact resistance, heat resistance, electrical properties, dimensional stability and moldability of the base resin including thereof may be excellent in balance.

In addition, the copolymer of vinylcyan-based monomer-conjugated diene-based monomer-aromatic vinyl-based monomer plays the role of providing a flame retardant resin composition including the same with excellent moldability and impact resistance and may be a graft copolymer with a core-shell structure, including a core including a derived unit of a conjugated diene-based monomer; and a shell wrapping the core and including a derived unit of an aromatic vinyl-based monomer and a derived unit of a vinylcyan-based monomer.

Meanwhile, in an embodiment of the present invention, the copolymer of vinylcyan-based monomer-conjugated diene-based monomer-aromatic vinyl-based monomer may be prepared through emulsion polymerization and emulsion graft polymerization, for example, may be prepared by preparing a core (or seed) which is a rubbery polymer by emulsion polymerizing a conjugated diene-based monomer, adding a vinylcyan-based monomer and aromatic vinyl-based monomer to the core, and performing emulsion graft polymerization.

Here, the core may be a bimodal including a large-size particle of which average particle diameter is greater than 0.2 μm and 0.35 μm or less, and gel content is 60 wt % to 95 wt %, and a small-size particle of which average particle diameter is from 0.05 μm to 0.2 μm and gel content is 50 wt % to 95 wt %, and in this case, the impact resistance and mechanical properties of the copolymer including thereof may be even more excellent.

In another embodiment, the core may include the large-size particle and the small-size particle in a weight ratio of 50:50 to 90:10, particularly, 60:40 to 75:25 or 60:40 to 70:30, and in this case, the dispersibility of the core is excellent and subsequent emulsion graft polymerization may be carried out smoothly, and thus, the copolymer having even better mechanical properties may be prepared.

Meanwhile, in the present invention, the average particle diameter was measured by a dynamic laser light scattering method using Nicomp 370HPL (Nicomp Co., USA) as an intensity value in gaussian mode.

In addition, the core was coagulated using a dilute acid or a metal salt, washed, and dried in a vacuum oven of 60° C. for 24 hours, the rubber lump thus obtained was cut fine with scissors, 1 g of rubber fragment was put in 100 g of toluene and stored in a dark room at room temperature for 48 hours, a gel was separated and dried, and the gel content was calculated by the following Mathematical Formula 1:

[Mathematical Formula 1]

Gel content (wt %)=[weight of insoluble fraction (gel) (g)/weight of specimen (g)]×100

In addition, the copolymer of vinylcyan-based monomer-conjugated diene-based monomer-aromatic vinyl-based monomer may include 40 wt % to 60 wt % of the core including the derived unit of a conjugated diene-based monomer; and 40 wt % to 60 wt % of the shell wrapping the core and including the derived unit of an aromatic vinyl-based monomer and the derived unit of a vinylcyan-based monomer, and in this case, the shell may include the derived unit of the aromatic vinyl-based monomer and the derived unit of the vinylcyan-based monomer in a weight ratio of 3:97 to 30:70, and in this case, the impact resistance, mechanical properties and moldability of the copolymer may become even more excellent.

Meanwhile, the copolymer of vinylcyan-based monomer-conjugated diene-based monomer-aromatic vinyl-based monomer may be included in 10 parts by weight to 40 parts by weight, particularly, 20 parts by weight to 30 parts by weight or 22 parts by weight to 30 parts by weight in the base resin, based on 100 parts by weight of the base resin as described above, and within this range, balance with other polymers included in the base resin may become good, and the impact resistance, mechanical properties and moldability properties of the copolymer of vinylcyan-based monomer-conjugated diene-based monomer-aromatic vinyl-based monomer may be sufficiently shown without diminishing the physical properties of the other polymers, and the impact resistance, heat resistance, electrical properties, dimensional stability and moldability of the base resin including thereof may be excellent in balance.

b) Organophosphorus-Based Flame Retardant

The organophosphorus-based flame retardant plays the role of providing a flame retardant resin composition including thereof with flame retardancy, and commonly used organophosphorus-based flame retardants which may impart flame retardancy without adversely affecting the base resin may be used without specific limitation, and particularly, one or more selected from the group consisting of diphenyl diphosphate, trimethyl phosphate, triethyl phosphate, triphenyl phosphate, tricresyl phosphate, trixylenyl phosphate, resorcinol bis(diphenyl phosphate), phenyl diresorcinol phosphate, bisphenol diphenyl phosphate, cresyl diphenyl phosphate, xylenyl diphenyl phosphate, phenyl di(isopropylphenyl)phosphate, triisophenyl phosphate, diphenyl phosphate, resorcinol diphosphate, and aromatic polyphosphate may be used, and particularly, bisphenol diphenyl phosphate may be used.

c) Hypophosphite-Based Compound

The hypophosphite-based compound is included in the flame retardant resin composition together with the organophosphorus-based flame retardant to impart the resin composition with whiteness and to assist the improvement of flame retardancy, and may be a compound represented by the following Formula 1:

[Formula 1]

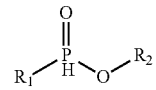

In Formula 1, $R_1$ and $R_2$ are each independently a hydrogen atom, a halogen group, a hydroxyl group, a cyano group, a nitro group, an alkyl group of 1 to 20 carbon atoms, a cycloalkyl group of 3 to 20 carbon atoms, an aryl group of 6 to 20 carbon atoms, an alkoxy group of 1 to 20 carbon atoms, an arylalkyl group of 7 to 20 carbon atoms, an alkylaryl group of 7 to 20 carbon atoms, an aryloxy group of 6 to 20 carbon atoms, or an alkyl group of 1 to 20 carbon atoms, containing Br, Cl or CN.

Particularly, in Formula 1, $R_1$ and $R_2$ may be each independently an alkyl group of 1 to 10 carbon atoms, a cycloalkyl group of 3 to 10 carbon atoms, an aryl group of 6 to 10 carbon atoms, an alkoxy group of 1 to 10 carbon atoms, an arylalkyl group of 7 to 12 carbon atoms, an alkylaryl group of 7 to 12 carbon atoms, an aryloxy group of 6 to 12 carbon atoms, or an alkyl group of 1 to 10 carbon atoms, containing Br, Cl or CN.

In another embodiment, the hypophosphite compound may be one or more selected from the group consisting of H-phosphonic acid, oxaphosphorine oxide, (3-chloropropyl) phosphinic acid, methyl cyclohexylphosphinate and n-butyl phenyl phosphinate, particularly, methyl cyclohexylphosphinate.

Meanwhile, the hypophosphite-based compound represented by Formula 1 is a metal salt-free hypophosphite compound, and may impart a flame retardant resin composition with high whiteness due to a P—H bond. Besides, the hypophosphite-based compound has excellent compatibility with the base resin, and may improve the whiteness of a flame retardant resin composition including thereof without adversely affecting the physical properties of the base resin.

d) Sulfur-Containing Compound

The sulfur-containing compound together with the hypophosphite-based compound plays the role of further improving flame retardancy through synergistic effects with the organophosphorus-based flame retardant, and may contain at least two sulfur atoms.

Particularly, the sulfur-containing compound may be ammonium thiosulfate, 2,2'-dithiobis(benzothiazole) or a mixture thereof.

In another embodiment, as described above, the flame retardant resin composition may include b) the organophosphorus-based flame retardant, c) the hypophosphite compound and d) the sulfur-containing compound in a weight ratio of 15 to 24:2 to 4:2 to 5, particularly, 15 to 24:2:2 to 5, more particularly, 15:2:2 to 5 in the present invention, and within this range, the three materials are included in an optimized ratio in the flame retardant resin composition, and due to the synergistic effects thereof, the flame retardancy and thermal deformation properties of a flame retardant resin composition including the same may be even more improved.

Meanwhile, in an embodiment of the present invention, the flame retardant resin composition may further include one or more kinds of additive selected from the group consisting of an anti-dripping agent, a lubricant, an antioxidant, a light stabilizer, a chain enhancer, a catalyst, a releasing agent, a pigment, a dye, an antistatic agent, antimicrobials, a processing aid, a metal deactivator, a smoke suppressant, an inorganic filler, a glass fiber, a friction modifier, an abrasion inhibitor and a coupling agent, and in this case, the additive may be used in 5 parts by weight or less, or 0.1 parts by weight to 1.0 parts by weight based on 100 parts by weight of the base resin.

In addition, particular materials of the additive may be any commonly used materials without specific limitation, and may use, for example, as the anti-dripping agent, one or more selected from the group consisting of Teflon, polyamide, polysilicone, polytetrafluoroethylene (PTFE) and a tetrafluoroethylene-hexafluoropropylene (TFE-HFP) copolymer may be used considering additional improvement of flame retardancy, and as the lubricant, magnesium stearate or wax may be used considering the improvement of the melt index of the flame retardant resin composition.

In addition, the present invention provides a flame retardant resin molded article manufactured from the flame retardant resin composition.

The flame retardant resin molded article according to an embodiment of the present invention is characterized in having a flammability class of V-0 measured according to the flammability standards of UL-94 VB, and a thermal deformation temperature of 80° C. or more measured under load conditions of 18.5 kg/cm$^2$ according to ASTM D648.

Meanwhile, the molded article may be manufactured by melt-mixing a flame retardant resin composition and then, extruding or injecting, and for example, by primarily mixing the flame retardant resin composition in a mixer or super mixer, melt-mixing at a temperature of 240° C. to 280° C. using one mixing processing apparatus of a twin-screw extruder, a single-screw extruder, roll-mills, a kneader, and a banbury mixer, extrusion processing to obtain a pellet, sufficiently drying the pellet using a dehumidifying dryer or a hot air dryer, and injection processing.

The flame retardant resin molded article according to an embodiment of the present invention is manufactured from a flame retardant resin composition including a base resin including a polyarylene ether-based polymer, an aromatic vinyl-based polymer and a copolymer of vinylcyan-based monomer-conjugated diene-based monomer-aromatic vinyl-based monomer, an organophosphorus-based flame retardant, a hypophosphite-based compound and a sulfur-containing compound, and due to the base resin, impact resistance, heat resistance, electrical properties, dimensional stability, and moldability may be excellent in balance, and due to the synergistic effects of the organophosphorus-based flame retardant, the hypophosphite-based compound and the sulfur-containing compound, flame retardancy may be sufficiently excellent and thermal deformation properties may be excellent.

Hereinafter, embodiments of the present invention will be explained in detail so that a person skilled in the art may easily perform. However, the present invention may be embodied in various different types, and is not limited to the embodiments explained hereinafter.

In addition, compounds used in the examples and comparative examples are as follows.

mPPO (polyphenylene ether polymer): poly(2,6-dimethyl-1,4-phenylene oxide) (weight average molecular weight: 30,000 g/mol) was used.

PS (aromatic vinyl-based polymer): a polystyrene resin of general purpose of which weight average molecular weight was 150,000 g/mol, and rubber content was 0 wt % was used.

ABS (AN 5 wt %): to 55 wt % of a butadiene rubber core (polybutadiene rubber), 40 wt % of styrene and 5 wt % of acrylonitrile were injected, and based on 100 parts by weight thereof, 0.01 parts by weight of rosin soap was injected for emulsion graft polymerization, and coagulation was performed with a sulfate to prepare a powder for use.

Flame retardant 1: bisphenol A bis(diphenylphosphate) (CAS No. 181028-79-5) was used.

Flame retardant 2: methyl cyclohexyl phosphinate

Flame retardant 3: ammonium thiosulfate

Flame retardant 4: 2,2'-dithiobis(benzothiazole)

Flame retardant 5: antimony trioxide

Flame retardant 6: distearyl thiodipropionate
Flame retardant 7: poly(dimethylsiloxane)
Flame retardant 8: sodium borohydride Example 1 to Example 7

All components were mixed in ratios shown in Table 1 below to prepare flame retardant resin compositions, and in Table 1, the amounts were shown based on 100 parts by weight of a base resin including mPPO, PS and ABS.

TABLE 1

| Division | Example 1 | Example 2 | Example 3 | Example 4 | Example 5 | Example 6 | Example 7 |
|---|---|---|---|---|---|---|---|
| mPPO | 35 | 35 | 35 | 35 | 35 | 35 | 35 |
| PS | 40 | 40 | 40 | 40 | 40 | 40 | 40 |
| ABS | 25 | 25 | 25 | 25 | 25 | 25 | 25 |
| Flame retardant 1 | 18 | 18 | 18 | 15 | 24 | 15 | 24 |
| Flame retardant 2 | 2 | 2 | 2 | 2 | 4 | 2 | 4 |
| Flame retardant 3 | 3 | 5 | — | 5 | — | — | 5 |
| Flame retardant 4 | — | — | 5 | — | 2 | 2 | — |

Comparative Example 1 to Comparative Example 9

All components were mixed in ratios shown in Table 2 below to prepare flame retardant resin compositions, and in Table 2, the amounts were shown based on 100 parts by weight of a base resin including mPPO, PS and ABS.

TABLE 2

| | Comparative Example | | | | | | | | |
|---|---|---|---|---|---|---|---|---|---|
| Division | 1 | 2 | 3 | 4 | 5 | 6 | 7 | 8 | 9 |
| mPPO | 35 | 35 | 35 | 35 | 35 | 35 | 35 | 35 | 35 |
| PS | 40 | 40 | 40 | 40 | 40 | 40 | 40 | 40 | 40 |
| ABS | 25 | 25 | 25 | 25 | 25 | 25 | 25 | 25 | 25 |
| Flame retardant 1 | 22 | 18 | 18 | 18 | 18 | 18 | 18 | 14 | 25 |
| Flame retardant 2 | 2 | 2 | — | 2 | 2 | 2 | 2 | 2 | 4 |
| Flame retardant 3 | — | — | — | — | — | — | — | — | 5 |
| Flame retardant 4 | — | — | 5 | — | — | — | — | 2 | — |
| Flame retardant 5 | — | — | — | 5 | — | — | — | — | — |
| Flame retardant 6 | — | — | — | — | 5 | — | — | — | — |
| Flame retardant 7 | — | — | — | — | — | 5 | — | — | — |
| Flame retardant 8 | — | — | — | — | — | — | 5 | — | — |

Experimental Example

With each of the flame retardant resin compositions of the Examples and Comparative Examples, 0.5 parts by weight of a lubricant (magnesium stearate, CAS No. 557-04-0), 0.5 parts by weight of a stabilizer (Irganox 1010, CAS No. 6683-19-8) and 0.1 parts by weight of an anti-dripping agent (Teflon) were mixed, and injected into a twin-screw extruder set to a temperature of 270° C. and extruded to manufacture a pellet, and then, injected to form a specimen with a plaque shape with a thickness of 2 mm and a specimen with a bar shape, respectively. The physical properties of each specimen thus manufactured were evaluated by the methods described below, and the results are shown in Table 3 below.

1) Flame Retardancy

By using five specimens having a plaque shape with a thickness of 2 mm, first combustion, and second combustion were conducted, and combustion time and glowing time were recorded, and flammability class was assessed according to the flammability standards of UL-94 V test. In this case, V-0 represented that first combustion time (t1) and second combustion time (t2) were within 10 seconds for each, the sum of combustion times of all five specimens was less than 50 seconds, and no ignition was found on bottom cotton, V-1 represented that combustion time was within 30 seconds for each, the sum of combustion times of all five specimens was less than 250 seconds, and no ignition was found on bottom cotton, and N.G. represented the others. The specimen assessed by N.G. means a flame retardant material having low flame retardancy and difficulty in application.

2) Thermal deformation temperature

By using the specimen with a bar shape, measurement was conducted under load conditions of 18.5 kg/cm$^2$ according to ASTM D648. A temperature of 80° C. or higher means excellent thermal deformation properties.

TABLE 3

| Division | Flammability (class) | Thermal deformation temperature (° C.) |
|---|---|---|
| Example 1 | V-0 | 82 |
| Example 2 | V-0 | 84 |
| Example 3 | V-0 | 84 |
| Example 4 | V-0 | 93 |
| Example 5 | V-0 | 94 |
| Example 6 | V-0 | 91 |
| Example 7 | V-0 | 84 |
| Comparative Example 1 | V-0 | 78 |
| Comparative Example 2 | N.G. | 73 |
| Comparative Example 3 | V-1 | 86 |
| Comparative Example 4 | N.G. | 82 |
| Comparative Example 5 | N.G. | 69 |
| Comparative Example 6 | N.G. | 73 |
| Comparative Example 7 | N.G. | 84 |
| Comparative Example 8 | N.G. | 92 |
| Comparative Example 9 | V-1 | 74 |

As shown in Table 3 above, it was confirmed that Examples 1 to 7 showed improved flame retardancy and excellent thermal deformation properties when compared with Comparative Examples 1 to 9. Particularly, Examples 1 to 7 of the present application showed excellent flame retardancy and markedly improved thermal deformation properties even using a decreased amount of organophosphorus-based flame retardant when compared with Comparative Example 1, and Comparative Example 2 and Comparative Example 3, which do not include the sulfur-containing compound or the hypophosphite compound, which is suggested in the present invention, showed markedly degraded flame retardancy and degraded thermal deformation properties.

In addition, Comparative Examples 4 to 7, which used a common flame retardant additive together with the organophosphorus-based flame retardant and the hypophosphite compound, could not show flame retardancy suitable to the standards of flame retardancy and showed decreased thermal deformation properties when compared with those of the Examples.

In addition, Comparative Examples 8 and 9, which include the organophosphorus-based flame retardant, the hypophosphite and the sulfur-containing compound, but in a range ratio deviated from the weight ratio suggested by the present invention, could not show flame retardancy suitable to the standards of flame retardancy or showed markedly degraded flame retardancy and thermal deformation properties when compared with the Examples.

From the results, the flame retardant resin composition according to the present invention includes an organophosphorus-based flame retardant, a hypophosphite compound and a sulfur-containing compound containing at least two sulfur atoms, in a specific weight ratio, and due to the synergistic effects of the organophosphorus-based flame retardant, the hypophosphite compound and the sulfur-containing compound, sufficiently improved flame retardancy may be achieved even using a decreased amount of the organophosphorus-based flame retardant. Accordingly, the degradation of thermal deformation properties due to the excessive use of the organophosphorus-based flame retardant may be restrained, and as a result, flame retardancy and thermal deformation properties may be excellent in balance.

The invention claimed is:

1. A flame retardant resin composition, comprising:
a) a base resin comprising a polyarylene ether-based polymer; an aromatic vinyl-based polymer and a copolymer of vinylcyan-based monomer-conjugated diene-based monomer-aromatic vinyl-based monomer;
b) a nonhalogen organophosphorus-based flame retardant;
c) a hypophosphite compound; and
d) a sulfur-containing compound comprising at least two sulfur atoms,
wherein b) the nonhalogen organophosphorus-based flame retardant, c) the hypophosphite compound and d) the sulfur-containing compound are comprised in a weight ratio of 15 to 24:2 to 4:2 to 5, and
wherein c) the hypophosphite compound is one or more selected from the group consisting of (3-chloropropyl) phosphinic acid, methyl cyclohexyl phosphinate and n-butyl phenyl phosphinate.

2. The flame retardant resin composition of claim 1, wherein the flame retardant resin composition comprises: a) 100 parts by weight of the base resin; b) 10 parts by weight to 40 parts by weight of the nonhalogen organophosphorus-based flame retardant; c) 0.1 parts by weight to 5.0 parts by weight of the hypophosphite compound; and d) 1 part by weight to 12 parts by weight of the sulfur-containing compound.

3. The flame retardant resin composition of claim 1, wherein b) the nonhalogen organophosphorus-based flame retardant is one or more selected from the group consisting of diphenyl diphosphate, trimethyl phosphate, triethyl phosphate, triphenyl phosphate, tricresyl phosphate, trixylenyl phosphate, resorcinol bis(diphenyl phosphate), phenyl diresorcinol phosphate, bisphenol diphenyl phosphate, cresyl diphenyl phosphate, xylenyl diphenyl phosphate, phenyl di(isopropylphenyl)phosphate, triisophenyl phosphate, diphenyl phosphate, resorcinol diphosphate, and aromatic polyphosphate.

4. The flame retardant resin composition of claim 1, wherein d) the sulfur-containing compound is ammonium thiosulfate, 2,2'-dithiobis(benzothiazole), or a mixture thereof.

5. The flame retardant resin composition of claim 1, wherein a) the base resin comprises, based on 100 parts by weight of the base resin, 20 parts by weight to 70 parts by weight of the polyarylene ether-based polymer; 20 parts by weight to 70 parts by weight of the aromatic vinyl-based polymer; and 10 parts by weight to 40 parts by weight of the copolymer of vinylcyan monomer-conjugated diene monomer-aromatic vinyl monomer.

6. The flame retardant resin composition of claim 1, wherein the polyarylene ether-based polymer is a homopolymer or copolymer comprising a unit represented by the following Formula 2:

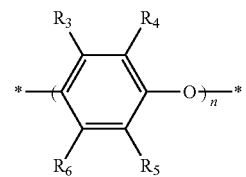

[Formula 2]

in Formula 2,
$R_3$ to $R_6$ are each independently a hydrogen atom, a halogen group, a hydroxyl group, a cyano group, a nitro group, an alkyl group of 1 to 20 carbon atoms, a cycloalkyl group of 3 to 20 carbon atoms, an aryl group of 6 to 20 carbon atoms, an alkoxy group of 1 to 20 carbon atoms, an arylalkyl group of 7 to 20 carbon atoms, an alkylaryl group of 7 to 20 carbon atoms, an aryloxy group of 6 to 20 carbon atoms, or an alkyl group of 1 to 20 carbon atoms containing Br, Cl or CN, and
n is an integer of 4 to 20.

7. The flame retardant resin composition of claim 1, wherein the polyarylene ether-based polymer is one or more selected from the group consisting of poly(2,6-dimethyl-1,4-phenyleneoxide), poly(2,6-diethyl-1,4-phenyleneoxide), poly(2-methyl-6-ethyl-1,4-phenyleneoxide), poly(2-methyl-6-propyl-1,4-phenyleneoxide), poly(2,6-dipropyl-1,4-phenyleneoxide), poly(2-ethyl-6-propyl-1,4-phenyleneoxide), poly(2,6-dimethoxy-1,4-phenyleneoxide), poly(2,6-di(chloromethyl)-1,4-phenyleneoxide), poly(2,6-di(bromomethyl)-1,4-phenyleneoxide), poly(2,6-diphenyl-1,4-phenyleneoxide), poly(2,6-dichloro-1,4-phenyleneoxide), poly(2,6-dibenzyl-1,4-phenyleneoxide) and poly(2,5-dimethyl-1,4-phenyleneoxide).

8. The flame retardant resin composition of claim 1, wherein the aromatic vinyl-based polymer has a weight average molecular weight of 10,000 g/mol to 300,000 g/mol.

9. The flame retardant resin composition of claim 1, wherein the copolymer of vinylcyan monomer-conjugated diene monomer-aromatic vinyl monomer is a graft copolymer with a core-shell structure, comprising: a core comprising a derived unit of a conjugated diene monomer; and a shell wrapping the core and comprising a derived unit of an aromatic vinyl monomer and a derived unit of a vinylcyan monomer.

10. The flame retardant resin composition of claim 1, wherein the copolymer of vinylcyan monomer-conjugated diene monomer-aromatic vinyl monomer comprises 40 wt % to 60 wt % of the core comprising the derived unit of the conjugated diene monomer; and 40 wt % to 60 wt % of the shell wrapping the core and comprising the derived unit of the aromatic vinyl monomer and the derived unit of the vinylcyan monomer, and the shell comprises the derived unit of the aromatic vinyl monomer and the derived unit of the vinylcyan monomer in a weight ratio of 3:97 to 30:70.

11. A flame retardant resin molded article manufactured from the flame retardant resin composition of claim 1, wherein flammability class measured according to flammability standards of UL-94 VB and a thickness of 2 mm is V-0, and thermal deformation temperature measured under load conditions of 18.5 kg/cm$^2$ according to ASTM D648 is 80° C. or more.

* * * * *